(12) United States Patent
Sato et al.

(10) Patent No.: US 11,603,275 B2
(45) Date of Patent: Mar. 14, 2023

(54) DRIVE TRANSMISSION DEVICE, IMAGE READING APPARATUS, AND RECORDING APPARATUS

(71) Applicant: CANON KABUSHIKI KAISHA, Tokyo (JP)

(72) Inventors: Kuniaki Sato, Inagi (JP); Hiroyuki Saito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1126 days.

(21) Appl. No.: 16/163,868

(22) Filed: Oct. 18, 2018

(65) Prior Publication Data

US 2019/0132463 A1    May 2, 2019

(30) Foreign Application Priority Data

Oct. 31, 2017    (JP) .............................. JP2017-211320

(51) Int. Cl.
| | |
|---|---|
| *B65H 3/06* | (2006.01) |
| *H04N 1/00* | (2006.01) |
| *H04N 1/32* | (2006.01) |
| *H04N 1/12* | (2006.01) |

(Continued)

(52) U.S. Cl.
CPC ............. *B65H 3/0669* (2013.01); *B65H 5/06* (2013.01); *F16H 7/00* (2013.01); *H04N 1/00602* (2013.01); *H04N 1/00673* (2013.01); *H04N 1/00793* (2013.01); *H04N 1/00933* (2013.01); *H04N 1/122* (2013.01); *H04N 1/32085* (2013.01); *B65H 2402/31* (2013.01); *B65H 2403/25* (2013.01); *B65H 2404/255* (2013.01)

(58) Field of Classification Search
CPC ........ B65H 3/0669; B65H 5/06; B65H 5/062; B65H 29/12; B65H 2402/31; B65H 2403/20; B65H 2403/21; B65H 2403/25; B65H 2404/1452; B65H 2404/25; B65H 2404/255; B65H 23/063; B65H 23/085; B65H 23/105; B65H 23/1825; B65H 23/1888; B65H 23/1955; H04N 1/00673; H04N 1/00933
See application file for complete search history.

(56) References Cited

U.S. PATENT DOCUMENTS 3,951,257 A * 4/1976 Storace ................. B65H 5/023
                                                            198/626.6

FOREIGN PATENT DOCUMENTS

| JP | 06-147280 A | 5/1994 |
|---|---|---|
| JP | 2011-008939 A | 1/2011 |

(Continued)

*Primary Examiner* — Prasad V Gokhale
(74) *Attorney, Agent, or Firm* — Canon U.S.A., Inc. I.P. Division

(57) ABSTRACT

A drive transmission device includes a chassis fixed to an apparatus main body and a driving roller that is driven by a driving source. A belt member transmits rotational force of the driving roller. A tension roller contacts the belt member to apply tension to the belt member. A support member supports the tension roller rotatably and is swingable about a rotational shaft of the chassis. A screw fixes the support member to the chassis at a predetermined position. A retaining member is able to be engaged with the chassis, in which the support member is arranged and fixed between a part of the retaining member and the chassis in an insertion direction of the screw.

14 Claims, 9 Drawing Sheets

(51) Int. Cl.
*F16H 7/00* (2006.01)
*B65H 5/06* (2006.01)

(56) References Cited

FOREIGN PATENT DOCUMENTS

| | | |
|---|---|---|
| JP | 2012-094397 A | 5/2012 |
| JP | 2013040667 A | 2/2013 |

* cited by examiner

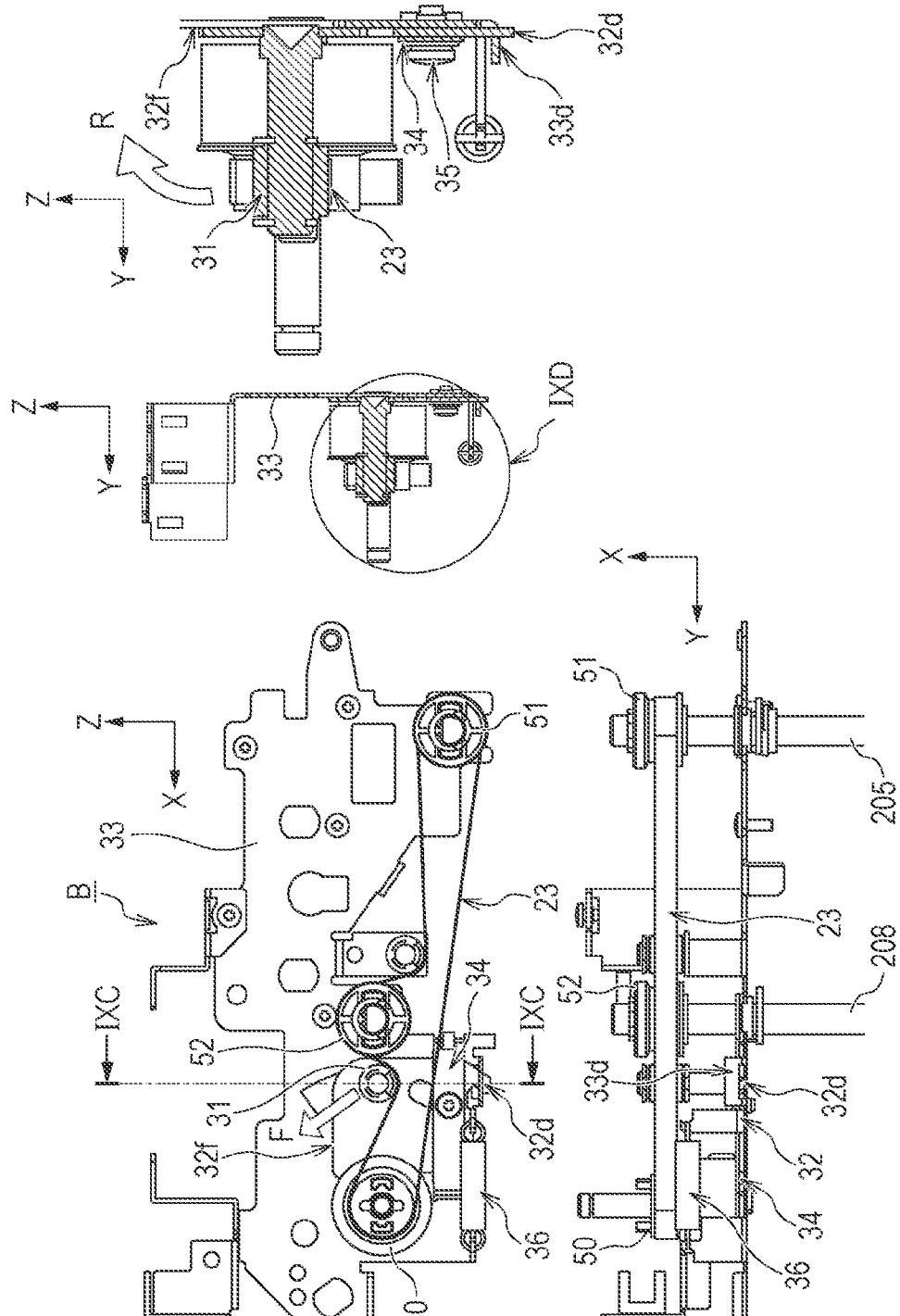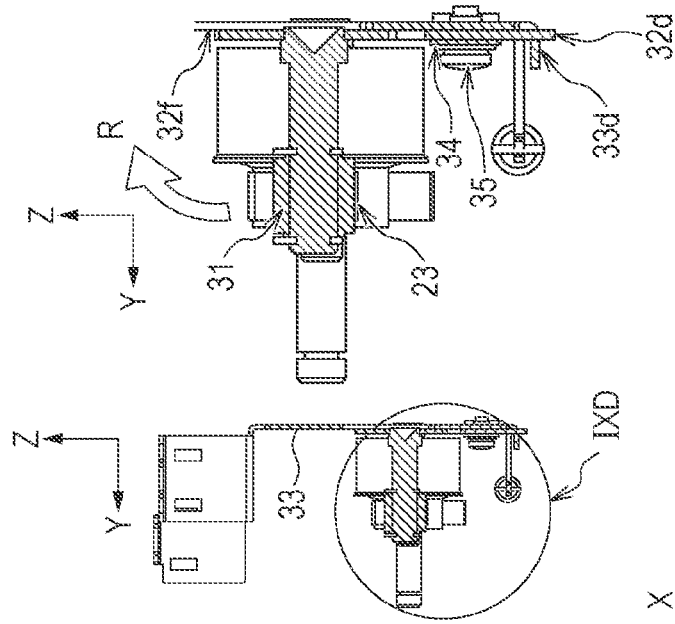

DRIVE TRANSMISSION DEVICE, IMAGE READING APPARATUS, AND RECORDING APPARATUS

BACKGROUND OF THE DISCLOSURE

Field of the Disclosure

The disclosure relates to a drive transmission device, an image reading apparatus, and a recording apparatus.

Description of the Related Art

In a tension transmission mechanism disclosed in Japanese Patent Laid-Open No. 2013-40667, a driving device including a belt member that transmits drive from a driving source to a tension roller adjusts tension of the belt member. A retaining member for the tension roller that stretches the belt member is fixed with a screw at a position where the belt member has desired tension. Thus, a screw inserting hole is provided in the retaining member. Since the screw inserting hole is formed larger than a diameter of the screw, a torque applied when the screw is fastened moves the retaining member in some cases. In Japanese Patent Laid-Open No. 2013-40667, the movement is suppressed by forming the screw inserting hole in a substantially cross shape.

In a configuration of Japanese Patent Laid-Open No. 2013-40667, however, the screw inserting hole needs to be formed smaller than a screw head in a tension adjustment direction, so that a range where tension is able to be adjusted is limited and it is difficult to adjust the belt member to have desired tension in some cases.

SUMMARY OF THE DISCLOSURE

The disclosure provides a drive transmission device capable of adjusting a belt member to have desired tension when a retaining member that retains the belt member is fastened and fixed by a fastening member.

And in more particularity, the disclosure provides a drive transmission device including a chassis fixed to an apparatus main body; a driving roller that is driven by a driving source; a belt member that transmits rotational force of the driving roller; a tension roller that contacts the belt member to thereby apply tension to the belt member; a support member that supports the tension roller rotatably and is swingable about a rotational shaft of the chassis; a screw by which the support member is fixed to the chassis at a predetermined position; and a retaining member that is able to be engaged with the chassis, in which the support member is arranged and fixed between a part of the retaining member and the chassis in an insertion direction of the screw.

Further features and aspects of the disclosure will become apparent from the following description of example embodiments with reference to the attached drawings.

BRIEF DESCRIPTION OF THE DRAWINGS

FIGS. 9A to 9D are three-view drawings of the belt driving portion of the ADF of the image reading apparatus.

DESCRIPTION OF THE EMBODIMENTS

The disclosure is applicable to a reading apparatus (document reading apparatus) that includes an automatic document feeder (ADF) and reads a document by using an image sensor (reading unit). The disclosure is also applicable to, in addition to the reading apparatus, a recording apparatus that has a recording function of recording an image together with a reading function. An example of the recording apparatus includes a multifunction apparatus (multifunction peripheral) also having other functions, such as a FAX function, in addition to a printing function (recording function). Further, the disclosure is also applicable to a recording apparatus that has a recording function of recording an image on a recording medium instead of the reading function. In such a case, not a document but a recording medium on which an image is to be recorded is stacked on a feeding tray, a recording unit is provided instead of a reading unit in a conveyance path, and the image is recorded by the recording unit on the recording medium that is conveyed.

Figure 1:
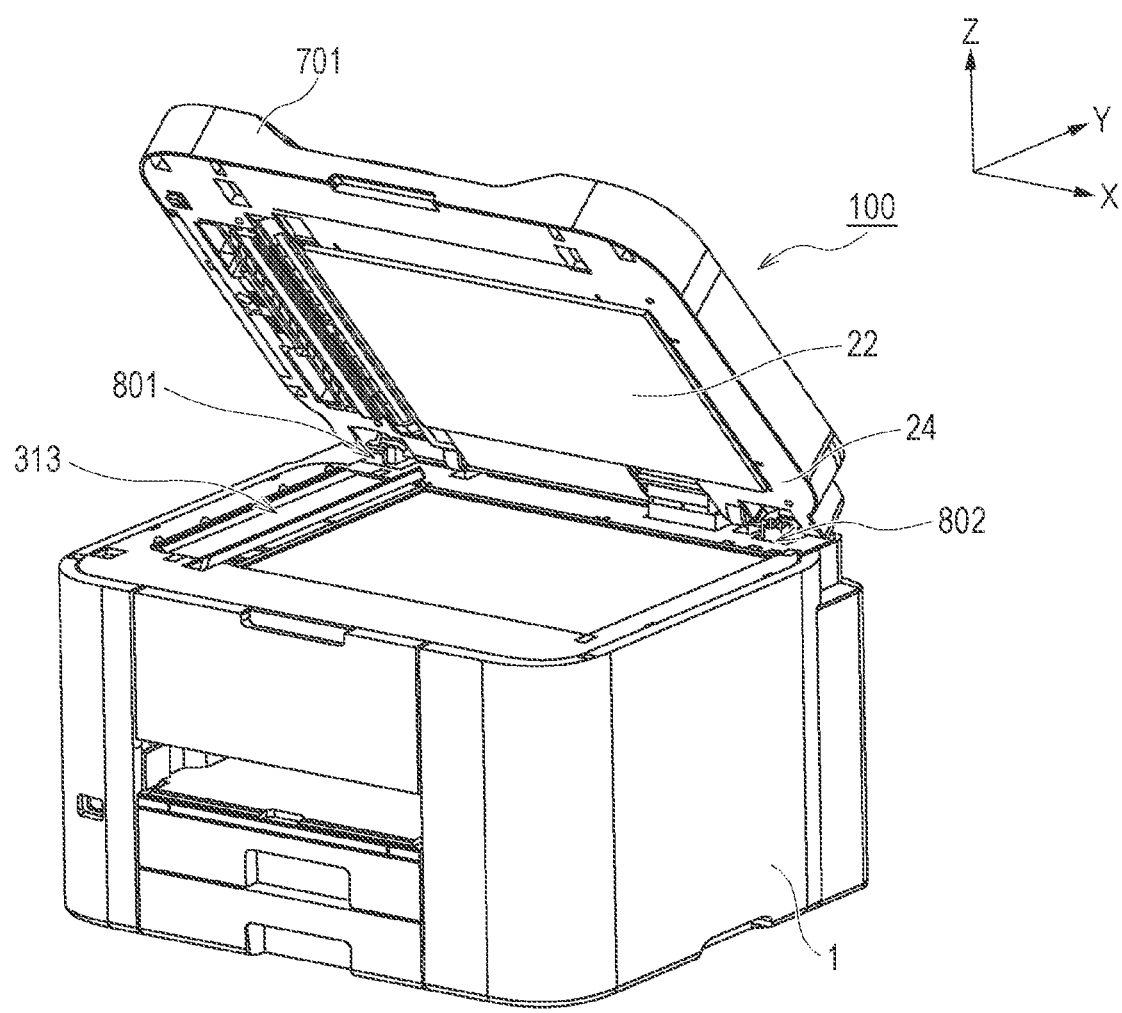
FIG. 1 is a perspective view illustrating an outer appearance of an example image reading apparatus.

FIG. 1 is a perspective view illustrating an outer appearance of an example image reading apparatus 100. The image reading apparatus 100 is arranged on a recording apparatus 1 that includes a recording unit. The image reading apparatus 100 has a document platen unit 313 provided with a reading sensor (reading unit) that reads an image, and an ADF 701 that is opened or closed with hinges 801 and 802 with respect to the document platen unit 313. The hinge 801 and the hinge 802 are arranged away from each other at right and left in an X direction illustrated in FIG. 1. FIG. 1 illustrates a state where the ADF 701 is opened with respect to the document platen unit 313, On a surface of the ADF 701, which faces the document platen unit 313, a base member 24 is arranged and a pressing plate 22 that presses a document against the document platen unit 313 is provided.

Note that, hereinafter, the X direction, a Y direction, and a Z direction respectively indicate a width direction, a depth direction, and a height (vertical) direction of the image reading apparatus 100. In a case where the image reading apparatus 100 is seen from a front surface to use the apparatus, an upstream side in the X direction corresponds to a left side of the apparatus and a downstream side corresponds to a right side of the apparatus. Moreover, an upstream side and a downstream side in the Y direction respectively correspond to a front (front surface) side and a back (rear surface) side when the image reading apparatus 100 is used.

Figure 2:
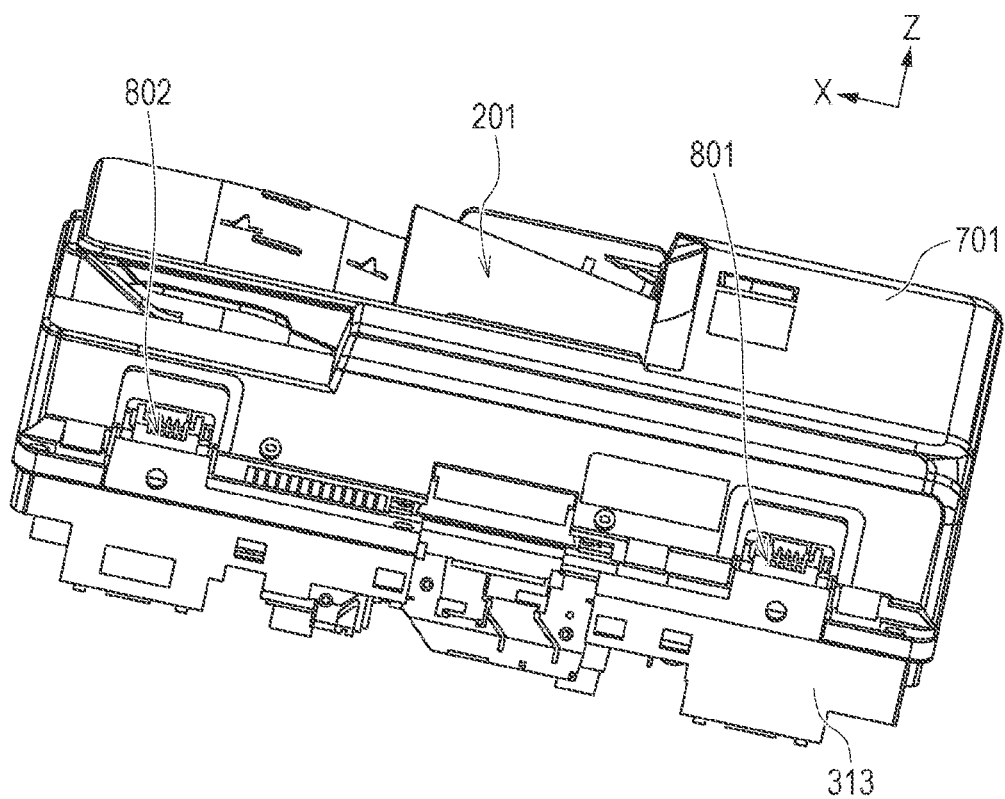
FIG. 2 is a side view of an ADF of the image reading apparatus as viewed from an apparatus rear surface side.

FIG. 2 is a side perspective view of the ADF 701 as viewed from the downstream side in the Y direction, that is, the rear surface side of the image reading apparatus 100. Since the hinges 801 and 802 are provided on the rear surface side of the apparatus, a user is able to perform an open or close operation of the ADF 701 on the front side of the apparatus. Each of the hinges 801 and 802 has a rotational axis and a damper mechanism. Axial directions of the two rotational axes are the same directions (X directions). In each of the hinges 801 and 802, one hinge component is fixed to the base member 24 and the other is fixed to the document platen unit 313.

Figure 3:
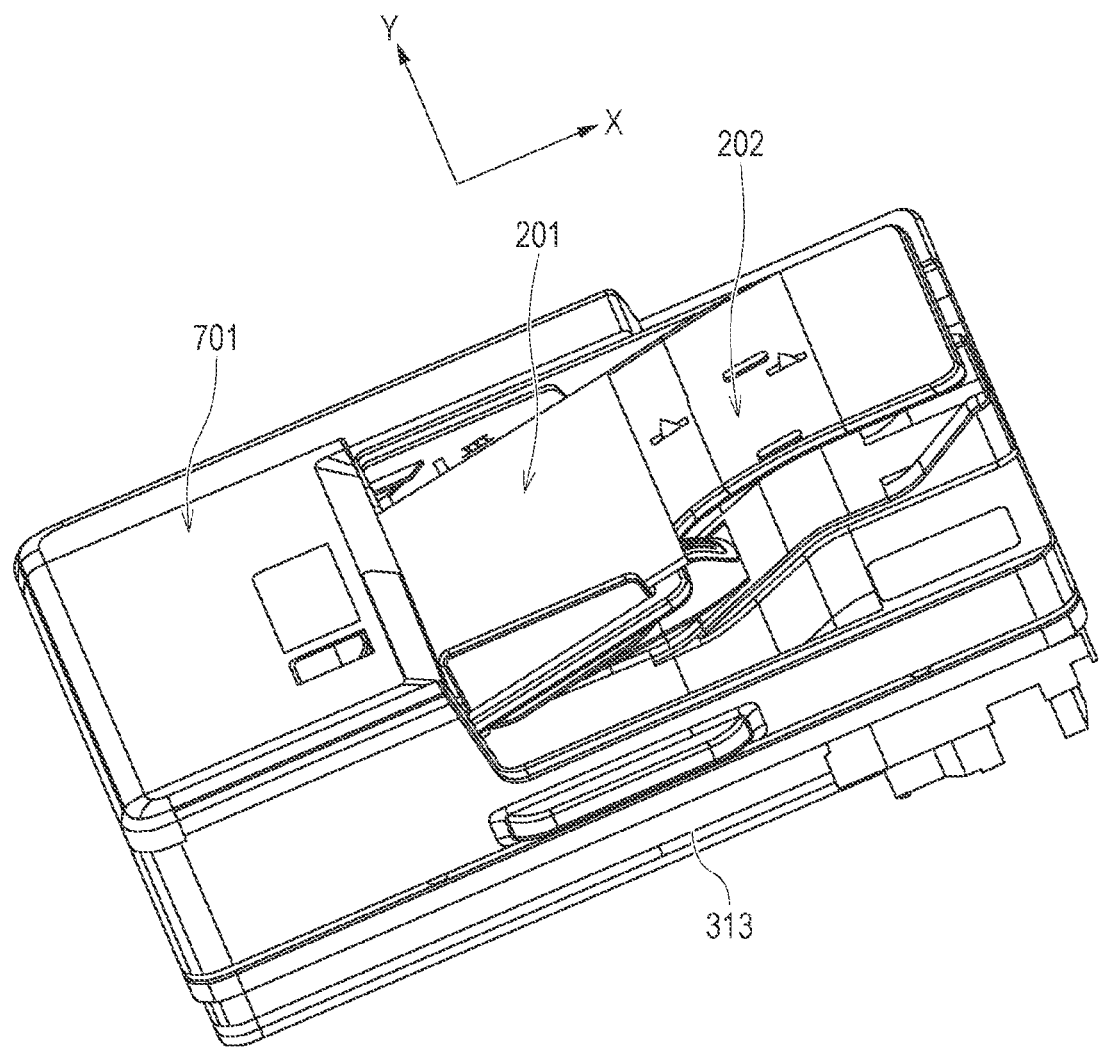
FIG. 3 is a top perspective view of the ADF of the image reading apparatus.

FIG. 3 is a top perspective view illustrating an outer appearance of the ADF 701 as viewed from above. A document tray 202 is provided on a top surface of the ADF 701 and a document 201 is set on the document tray 202 by the user.

Figure 4:
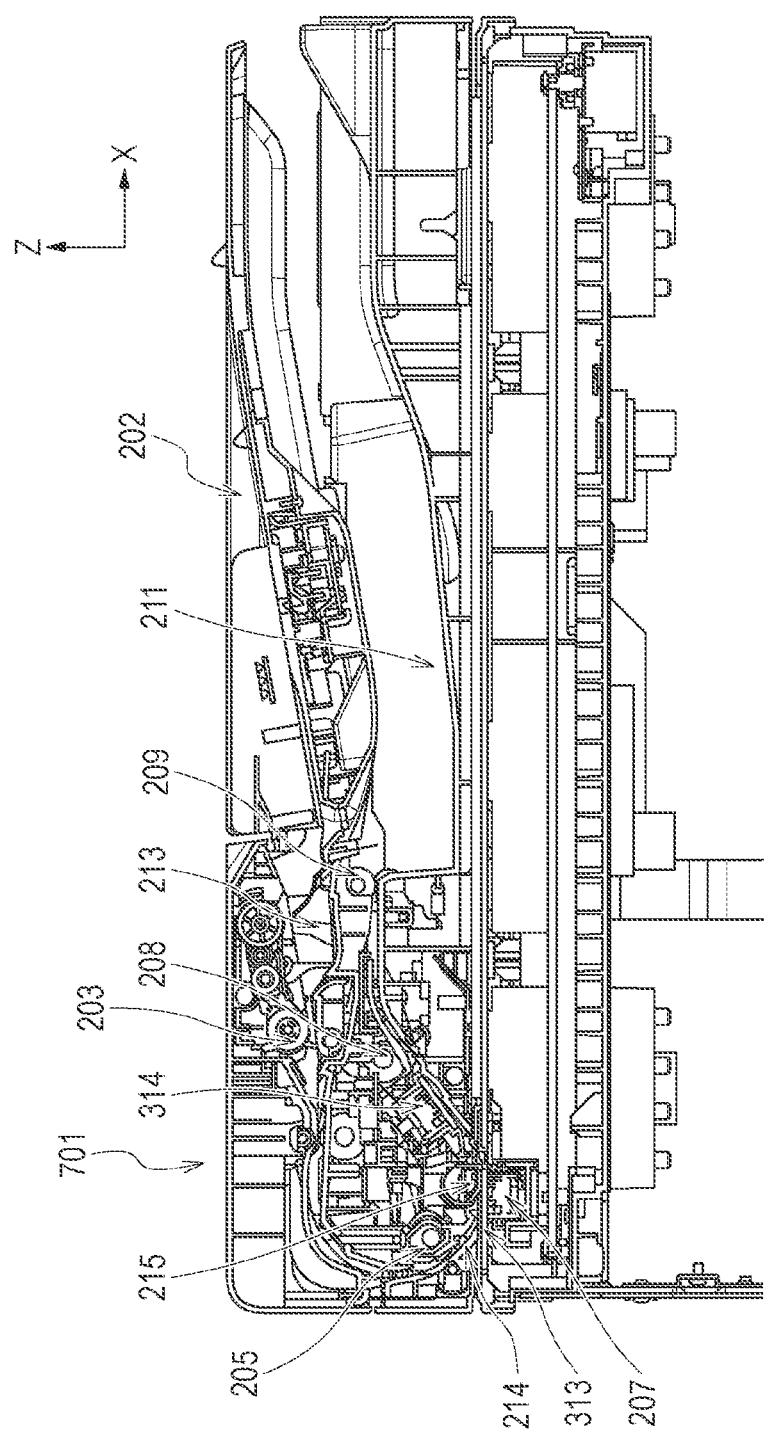
FIG. 4 is a sectional view of the ADF of the image reading apparatus as viewed from an apparatus front side.

FIG. 4 is a sectional view illustrating an inner structure of the ADF 701 when the image reading apparatus 100 is viewed from the front side. The ADF 701 has a conveyance path in which a document is conveyed and the conveyance path has a U-turn path in which the document 201 that is conveyed is reversely turned in a U-turn. That is, the document 201 that is set on the document tray 202 is conveyed to the upstream side in the X direction, and then reversed in a U-shape and conveyed toward the downstream side in the X direction, and discharged to a discharge tray 211 provided underneath the document tray 202.

The ADF 701 includes a document detection sensor 213 that detects whether the document 201 is set on the document tray 202, and an edge sensor 214 that detects a leading edge of the document 201 and decides timing of reading. A separation roller 203 is provided near a feeding port of the ADF 701 and separates the document 201 stacked on the document tray 202 one by one for feeding. On the conveyance path, a first conveyance roller 205 and a second conveyance roller 208 that convey the document 201 are arranged, and a discharge roller 209 that discharges the document 201 is provided near a discharge port. These rollers are rotatable by a motor M (refer to FIG. 5) described later. After a first surface of the document 201 that is conveyed by the rollers is read by a first reading sensor 207, a second surface thereof is read by a second reading sensor 314. Note that, the first reading sensor 207 is provided in the document platen unit 313 and the second reading sensor 314 is provided in the ADF 701.

A reading operation of the document 201 by the ADF 701 will be described in detail below. When the document 201 is set on the document tray 202 by the user, the document 201 is detected by the document detection sensor 213. After that, in accordance with an instruction to start the reading operation, the document 201 is separated and conveyed by the separation roller 203 and reversed in the U-turn path. After the document 201 is reversed, when the leading edge thereof is detected by the edge sensor 214 while the document 201 is being conveyed by the first conveyance roller 205, the document 201 is delivered to a space between a conveyance guide member 215 and a glass member of the document platen unit 313. The conveyance guide member 215 has a function of pressing the document 201 against the document platen unit 313 by an elastic mechanism to thereby improve accuracy of reading.

When the leading edge of the document 201 is detected by the edge sensor 214 and the document 201 is then conveyed until a step count of the motor M (refer to FIG. 5) reaches a predetermined number, the leading edge of the document 201 reaches the first reading sensor 207 and the first surface is read in accordance with conveyance by the first conveyance roller 205. The first surface at this time corresponds to an upper surface when the document 201 is set on the document tray 202.

When the document 201 conveyed to downstream of the conveyance guide member 215 is conveyed until the step count of the motor M reaches a predetermined number after reading in the first reading sensor 207 starts, the second surface is read by the second reading sensor 314. Here, the second surface is a surface of a back side of the first surface and corresponds to a lower surface when the document 201 is set on the document tray 202.

When a trailing edge of the document 201 is detected by the edge sensor 214 and the document 201 is conveyed until the step count of the motor M reaches a predetermined number, reading by the first reading sensor 207 is finished, and then, reading by the second reading sensor 314 is finished. The document 201 that has passed through the second reading sensor 314 passes through the second conveyance roller 208 and the discharge roller 209 and is discharged to the discharge tray 211. In this manner, through the step count of the motor M, distances from the leading and trailing edges of the document 201 to the first reading sensor 207 and the second reading sensor 314 are acquired, so that timing of conveyance of the document 201 by the rollers is matched with timing of reading.

Figure 5:
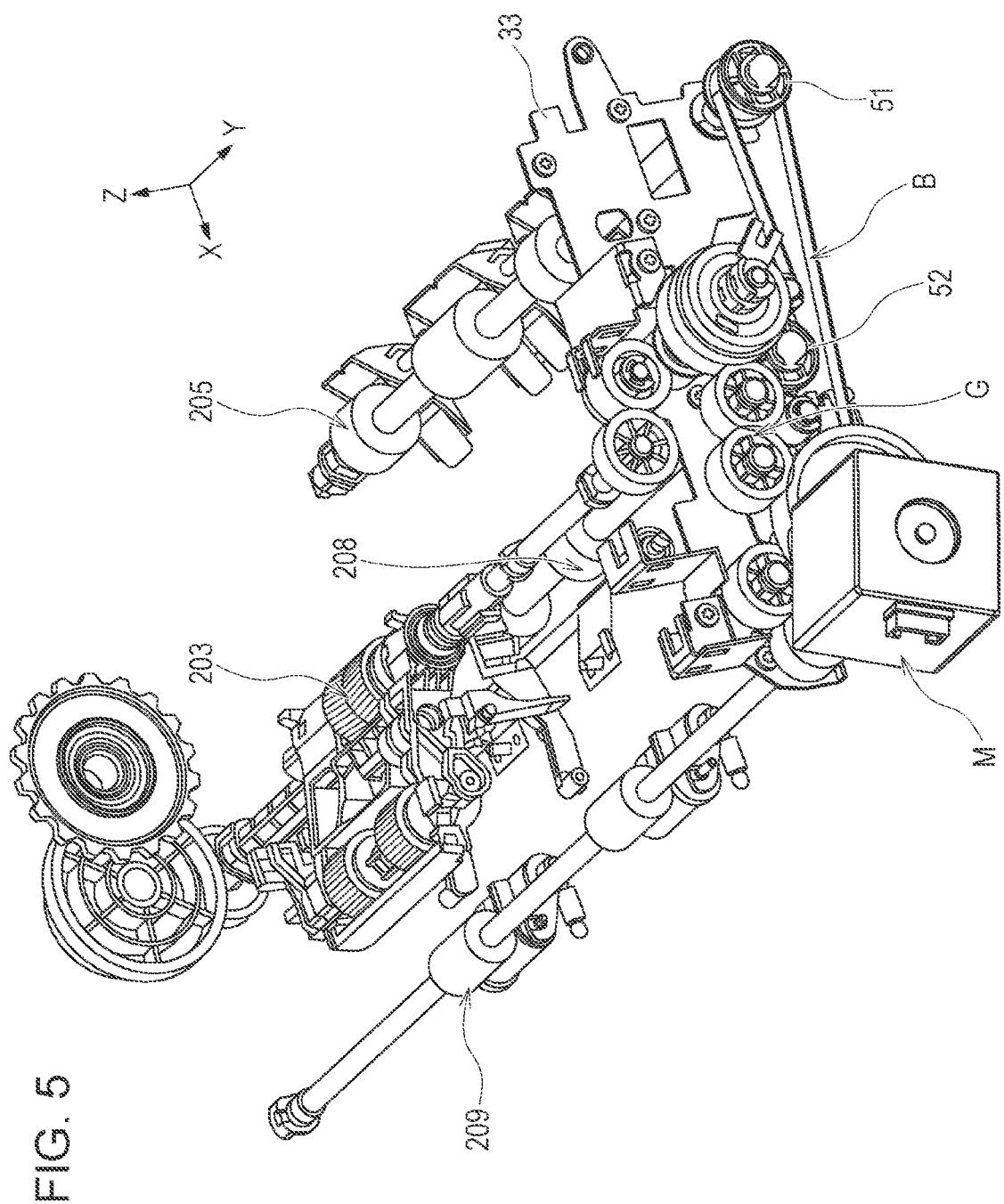
FIG. 5 is a perspective view of a drive train of the ADF of the image reading apparatus as viewed from the apparatus rear surface side.

FIG. 5 is a perspective view illustrating a drive train (drive transmission device) of the ADF 701 as viewed from the rear surface side of the image reading apparatus 100. When drive from the motor M that is a driving source is transmitted through an intermediate gear portion G and a belt driving portion B, the separation roller 203, the first conveyance roller 205, the second conveyance roller 208, and the discharge roller 209 rotate.

Figure 6:
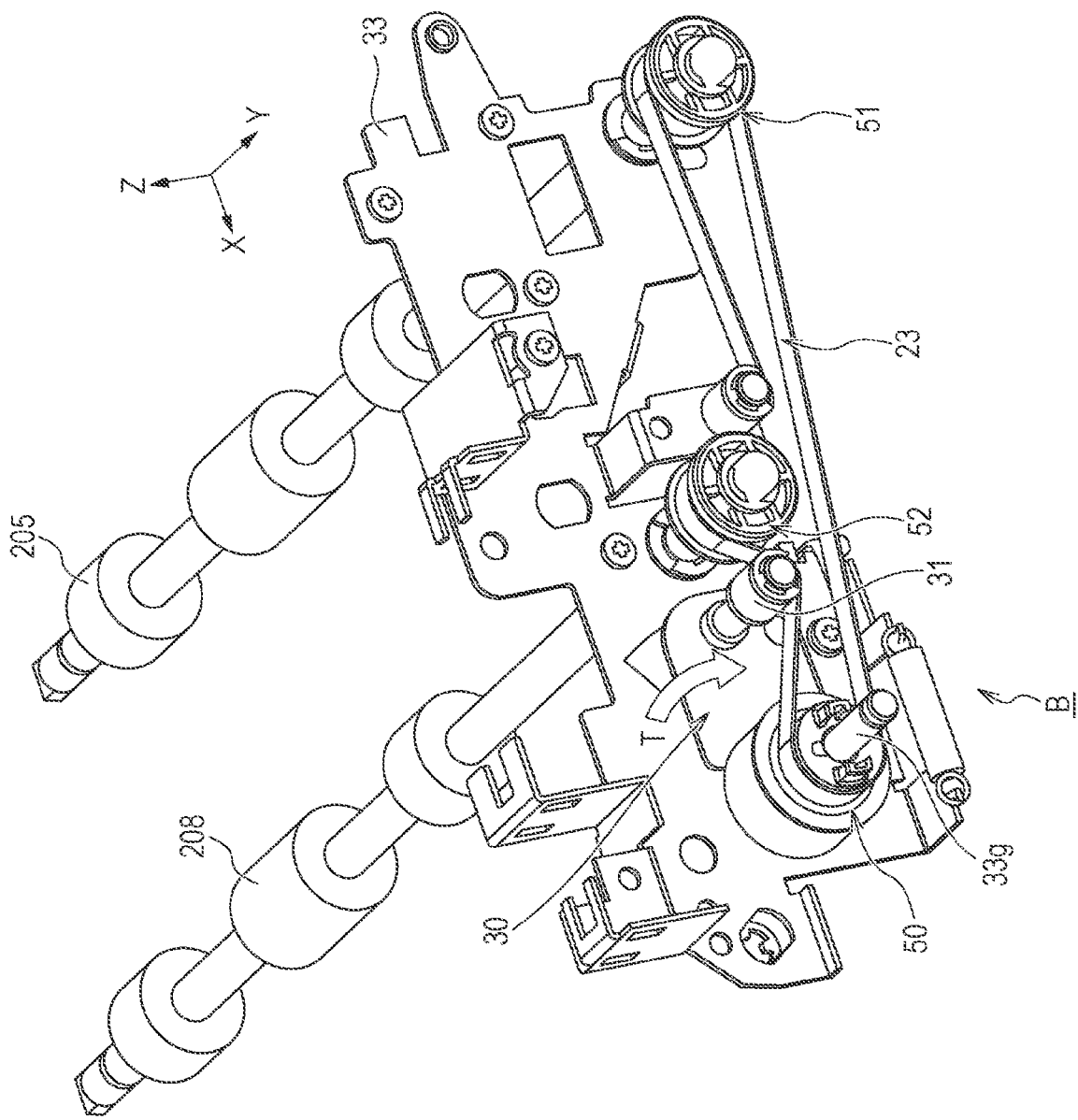
FIG. 6 is a detailed view of a belt driving portion in the drive train illustrated in FIG. 5.

FIG. 6 is a perspective view illustrating the belt driving portion B in FIG. 5 in detail. The belt driving portion B includes a tension adjustment mechanism 30, a timing belt (belt member) 23, a driving pulley 50, a first driven pulley 51, and a second driven pulley 52. The belt driving portion B is provided on a chassis 33 fixed to a main body of the image reading apparatus 100. The driving pulley 50 rotates the discharge roller 209, the first driven pulley 51 rotates the second conveyance roller 208, and the second driven pulley 52 rotates the first conveyance roller 205.

The tension adjustment mechanism 30 appropriately adjusts tension of the timing belt 23 by changing a position of a tension roller 31 contacting an outer peripheral surface of the timing belt 23. By the tension adjustment mechanism 30, teeth provided in the timing belt 23 are appropriately engaged with teeth of each of the pulleys and drive of the motor M is appropriately transmitted. In FIG. 6, a tension adjustment direction (tension applying direction) T is illustrated, and the tension of the timing belt 23 increases as the position of the tension roller 31 is shifted toward the tension adjustment direction T and the tension of the timing belt 23 decreases as the position of the tension roller 31 is shifted toward the opposite direction. The tension adjustment mechanism 30 prevents the drive transmission of the motor M from being cut by a so-called jumping phenomenon that the teeth of the timing belt 23 ride over the teeth of the pulley and tooth skipping occurs.

Figure 7:
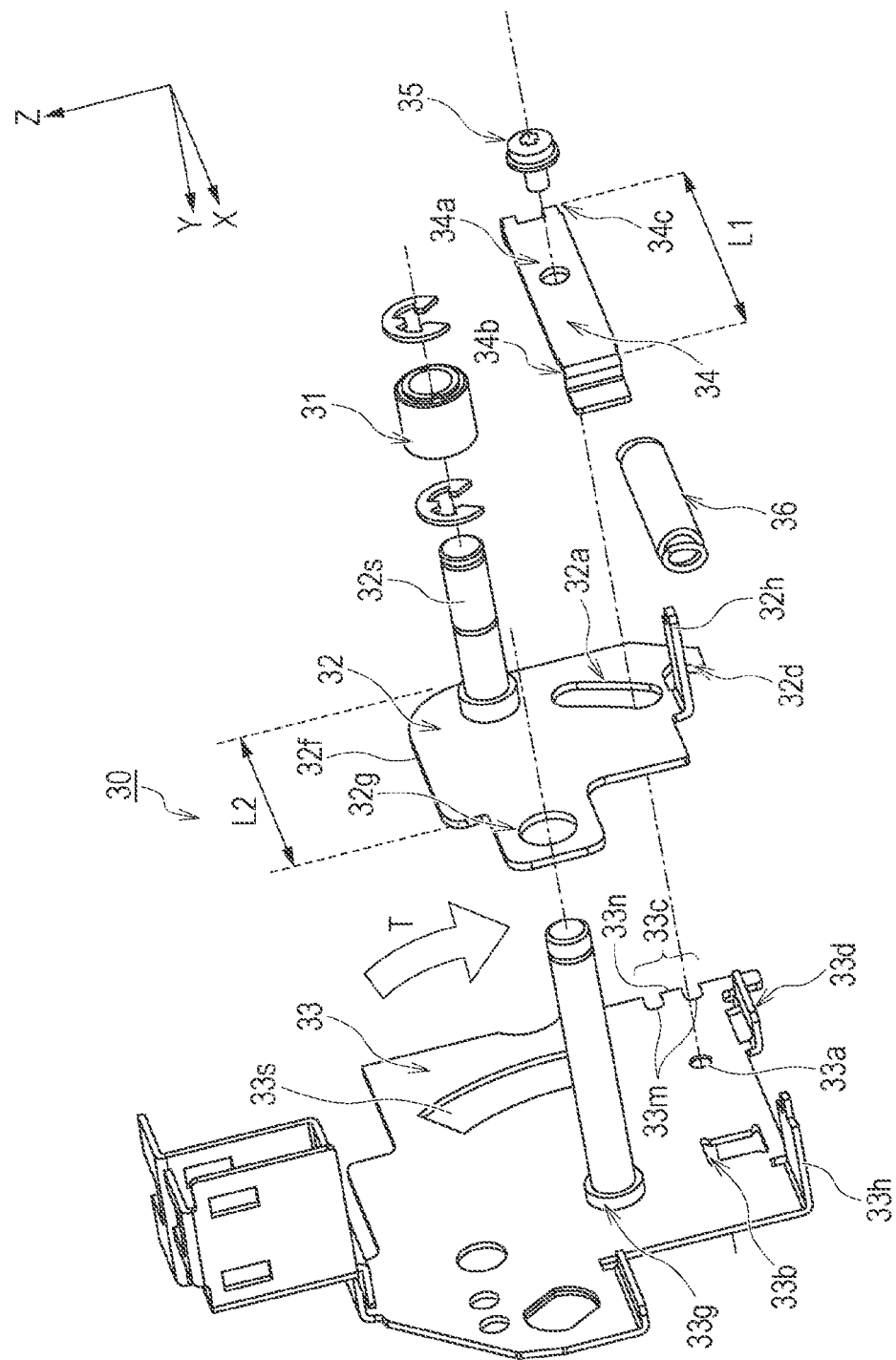
FIG. 7 is an exploded view of a tension adjustment mechanism in the belt driving portion illustrated in FIG. 6.

FIG. 7 is an exploded view illustrating the tension adjustment mechanism 30 in detail. The tension adjustment mechanism 30 mainly includes the tension roller 31, a support member 32 that has a function of a tensioner, and a tension spring (urging unit) 36, and these members are attached in the chassis 33. The tension roller 31 is a roller that contacts the timing belt 23 to apply tension and is attached rotatably around a tension roller shaft 32s of the support member 32.

The support member 32 is provided with the tension roller shaft 32s around which the tension roller 31 is attached, and a screw through hole 32a through which a screw (fastening member) 35 for fixing the support member 32 to the chassis 33 is able to pass. The support member 32 is also provided with a rotational shaft hole 32g through which a rotational shaft 33g of the chassis 33 described below is able to pass, and a spring attachment portion 32h by which an end of the tension spring 36 is able to be attached. The rotational shaft hole 32g is provided in a protrusion part of the support member 32, which protrudes in the downstream side of the X direction. The support member 32 further has a convex portion 32d at a position adjacent to the spring attachment portion 32h and the convex portion 32d is able to be inserted into a regulating portion 33d provided in the chassis 33.

In the present embodiment, the screw through hole 32a has a circular arc shape that extends along the tension adjustment direction T illustrated in FIG. 7 and an area of the screw through hole 32a corresponds to a range where adjustment is allowed in the tension adjustment direction T. The screw through hole 32a has the circular arc shape centered around the rotational shaft 33g of the chassis 33 described below.

The chassis 33 constituted by sheet metal or the like is provided with the rotational shaft 33g that is able to be fitted with the rotational shaft hole 32g of the support member 32, and a screw hole 33a by which the screw 35 is fixed. The chassis 33 is also provided with the regulating portion 33d that has an opening in which the convex portion 32d of the support member 32 is able to be inserted and a spring attachment portion 33h by which the other end of the tension spring 36 is able to be attached.

The chassis 33 is further provided with a hole 33s and the hole 33s has a circular arc shape centered around the rotational shaft 33g. The hole 33s is provided so as to correspond to a range where a shaft end of the tension roller shaft 32s on the downstream side in the Y direction moves, and is configured so as to allow assembling even when a part of the shaft end of the tension roller shaft 32s protrudes from the support member 32 due to a design tolerance or the like. Similarly to the screw through hole 32a, the hole 33s has a circular arc shape that extends in the tension adjustment direction T and is able to correspond to the adjustment allowable range of the screw through hole 32a in the tension adjustment direction T.

A retaining member 34 is a member of a substantially rectangular shape that is long in the X direction and is provided with a screw insertion hole 34a in which the screw 35 is able to be inserted. One end of the retaining member 34 in the X direction has a first rotation regulating portion (first engagement portion) 34b that has a stepped shape and the other end thereof has a second rotation regulating portion (second engagement portion) 34c that has a bent shape (refer to FIG. 8). The second rotation regulating portion 34c is provided with an opening. The screw insertion hole 34a is provided between the first rotation regulating portion 34b and the second rotation regulating portion 34c. The retaining member 34 is formed so that. when a length of the retaining member 34 in the X direction is L1 and a length of the support member 32 in the X direction excluding the protrusion part is L2, L1 is longer than L2 (L1>L2).

The first rotation regulating portion 34b is able to be inserted in an opening 33b that has a substantially rectangular shape and is provided in the chassis 33, and when being inserted therein, a part of the stepped shape comes to a rear surface of the chassis 33, so that the first rotation regulating portion 34b regulates movement in the Y direction with respect to the chassis 33. That is, when the first rotation regulating portion 34b is inserted in the opening 33b, the first rotation regulating portion 34b has an engagement relation with the opening 33h in the Y direction.

The second rotation regulating portion 34c is able to be engaged with a hook portion 33c provided in the chassis 33, and, when being engaged with the hook portion 33c, regulates movement in the Y direction with respect to the chassis 33. The hook portion 33c has two concave portions 33m that are provided side by side at a side end of the chassis 33 and a claw portion 33n that is formed by being held between the two concave portions 33m, and when the claw portion 33n is inserted in the opening of the second rotation regulating portion 34c, the engagement is achieved.

In this manner, when the first rotation regulating portion 34h is engaged with the opening 33b and the second rotation regulating portion 34c is engaged with the hook portion 33c, rotational movement of the retaining member 34 in an XZ plane is also regulated.

The tension spring 36 is fixed in such a manner that one end thereof is attached to the spring attachment portion 32h of the support member 32 and the other end thereof is attached to the spring attachment portion 33h of the chassis 33. With elastic force of the tension spring 36, the support member 32 is urged in the tension adjustment direction T, and the position of the tension roller 31 is changed with the tension roller shaft 32s, In this manner, tension is applied to the timing belt 23 on the basis of the elastic force of the tension spring 36.

Figure 8:
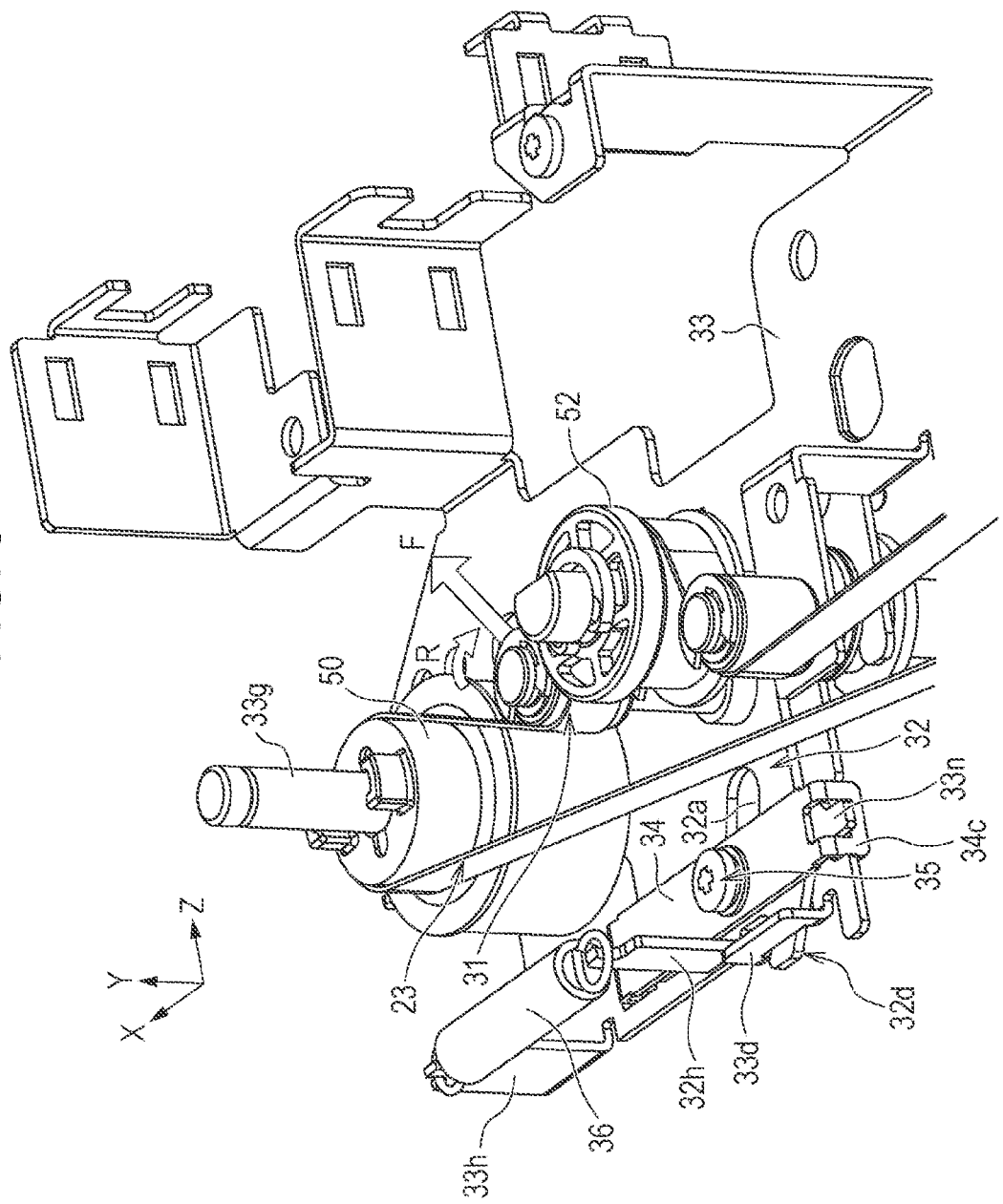
FIG. 8 is a perspective view of the belt driving portion of the ADF of the image reading apparatus.

FIG. 8 is a perspective view illustrating the belt driving portion B. With reference to FIGS. 7 and 8, assembling of components of the tension adjustment mechanism 30 will be described. First, in a state where the tension roller 31 is attached to the tension roller shaft 32s of the support member 32, the rotational shaft 33g of the chassis 33 is inserted in the rotational shaft hole 32g of the support member 32, so that the chassis 33 and the support member 32 are fitted. Thereby, the tension roller 31, the support member 32, and the chassis 33 are integrated.

When the support member 32 is swingable about the rotational shaft 33g, the tension roller 31 is movable in the tension adjustment direction T with the tension roller shaft 32s. When the tension roller 31 is moved in the tension adjustment direction to move to a predetermined position where desired tension is achieved, it is possible to adjust the tension of the timing belt 23 in accordance with mechanical tolerance or the like.

Then, the retaining member 34 is attached onto the support member 32. Here, due to the relation of L1>L2 described above, both ends of the retaining member 34 are engaged with the opening 33b and the hook portion 33c of the chassis 33 so as to cover the support member 32 from above. Thereby, the support member 32 is arranged between a part of the retaining member 34 and the chassis 33 in an insertion direction (Y direction) of the screw 35. In a state where movement of the retaining member 34 in the Y direction is regulated by engagement, the timing belt 23 is stretched around the pulleys.

Subsequently, the tension spring 36 is attached to the spring attachment portion 32h of the support member 32 and the spring attachment portion 33h of the chassis 33. Upon the attachment of the tension spring 36, tension is applied to the timing belt 23 through the support member 32 and the tension roller 31.

Finally, the screw 35 is screw-connected to the screw hole 33a of the chassis 33. At this time, the screw 35 passes through the screw insertion hole 34a of the retaining member 34 and the screw through hole 32a of the support member 32. By the screw connection, the support member 32 and the retaining member 34 are brought into pressure contact with the chassis 33 so that positions thereof are fixed.

Here, when the screw 35 is fastened to the screw hole 33a of the chassis 33, a torque that rotates the screw 35 applies rotational force about the screw insertion hole 34a to the retaining member 34. However, since the first rotation regulating portion 34b and the second rotation regulating portion 34c are engaged with the chassis 33, rotation of the retaining member 34 in the XZ plane is regulated. When the retaining member 34 is engaged with the chassis 33 in this manner, it is possible to suppress application of the rotational force to the support member 32 by the torque of the screw connection.

On the other hand, since the retaining member 34 and the support member 32 are not in an engagement relation, the rotational force is not applied to the support member 32 by the torque of the screw 35. That is, the support member 32 that is able to adjust the tension of the timing belt 23 is fixed while applying desired tension to the timing belt 23, without being affected by the torque of the screw 35.

In this manner, by classifying parts into a member (support member 32) that is related to adjustment of the tension of the timing belt 23 and a member (retaining member 34) that keeps desired tension of the timing belt 23, it is possible to suppress variation of the tension of the timing belt 23. Since the support member 32 related to the adjustment of the tension is not affected by the screw 35, a size of the screw through hole 32a is able to be adjusted in the tension adjustment direction T. That is, the range where the adjustment of the tension is allowed is not limited and a sufficient adjustment margin for the tension of the timing belt 23 is able to be secured.

FIGS. 9A to 9D are three-view drawings of the belt driving portion B. FIG. 9A is a front view of the belt driving portion B as viewed from the rear surface side of the image reading apparatus 100. FIG. 9B is a bottom view of the belt driving portion B as viewed from a lower side in a vertical direction. FIG. 9C is a sectional view taken along a line IXC-IXC illustrated in FIG. 9A and FIG. 9D is an enlarged view of a part circled with a line IXD in FIG. 9C.

When the support member 32 is urged by the tension spring 36, the tension roller shaft 32s receives reaction force F by the tension of the timing belt 23. The reaction force F is force in a direction opposite to the tension adjustment direction T. By the reaction force F, the support member 32 receives rotational force in a direction R about an upper end 32f that is a vertically upper end. The direction is a rotational direction in a YZ plane and a direction in which the upper end 32f is pressed against the chassis 33.

The rotational force in the direction R generates force by which the convex portion (engagement portion) 32d that is a vertically lower end of the support member 37 is directed to the downstream side in the Y direction, that is, force by which the support member 32 is separated from the chassis 33 to rise up in the Y direction. In order to suppress such force, when the support member 32 is attached to the chassis 33, the convex portion 32d is inserted in the opening of the regulating portion 33d for engagement, so that uplift of the convex portion 32d is regulated by the regulating portion 33d. Thereby, even when the tension roller shaft 32s receives the reaction force F from the timing belt 23, motion in the Y direction is regulated, thus making it possible to suppress variation of the tension of the timing belt 23. The regulating portion 33d that regulates rotation of the support member 32 in the direction R may be configured to be included in the retaining member 34, without limitation to the chassis 33.

Note that, the present embodiment is not limited to the drive transmission device arranged inside the ADF 701. The tension adjustment mechanism of the present embodiment is able to be adopted also in a drive transmission device that transmits drive of a conveyance motor that is arranged inside the recording apparatus 1 and conveys a recording medium.

That is, the disclosure provides a tension adjustment mechanism capable of adjusting a belt member to have desired tension when a retaining member that retains the belt member is fastened and fixed by a fastening member.

While the disclosure has been described with reference to example embodiments, it is to be understood that the disclosure is not limited to the disclosed example embodiments. The scope of the following claims is to be accorded the broadest interpretation so as to encompass all such modifications and equivalent structures and functions.

This application claims the benefit of Japanese Patent Application No. 2017-211320 filed Oct. 31, 2017, which is hereby incorporated by reference herein in its entirety.

What is claimed is:

1. A drive transmission device comprising:
a chassis fixed to an apparatus main body;
a driving roller that is driven by a driving source and rotates around a rotational shaft of the chassis;
a belt member that transmits rotational force of the driving roller;
a tension roller that contacts the belt member to thereby apply tension to the belt member;
a support member that supports the tension roller rotatably, is swingable about the rotational shaft, and includes an engagement portion that is able to be engaged with the chassis;
a screw by which the support member is fixed to the chassis at a predetermined position; and
a retaining member that is able to be engaged with the chassis,
wherein the support member is fixed between a part of the retaining member and the chassis in an insertion direction of the screw, and
wherein the retaining member is arranged between the engagement portion and the tension roller.

2. The drive transmission device according to claim 1, further comprising an urging unit configured to urge the support member in a tension applying direction in which the tension roller applies tension to the belt member.

3. The drive transmission device according to claim 2, wherein the support member includes a through hole through which the screw passes and the through hole extends in the tension applying direction.

4. The drive transmission device according to claim 1, wherein the retaining member is engaged with the chassis when the screw is fastened, so that movement in a rotational direction of the screw is regulated.

5. The drive transmission device according to claim 1, wherein the chassis is engaged with the engagement portion, so that uplift of the support member from the chassis is suppressed.

6. An image reading apparatus comprising:
a conveyance unit configured to convey a document;
a reading unit configured to read the document conveyed by the conveyance unit; and
a drive transmission device according to claim 1.

7. A recording apparatus comprising:
a recording unit configured to record an image on a recording medium;
a conveyance unit configured to convey the recording medium; and
a drive transmission device according to claim 1.

8. The drive transmission device according to claim 1, further comprising a first conveyance roller that conveys a sheet and a second conveyance roller that conveys the sheet conveyed by the first conveyance roller, wherein the first conveyance roller and the second conveyance roller are rotated by the belt member.

9. A drive transmission device comprising:
a chassis fixed to an apparatus main body;
a driving roller that is driven by a driving source and rotates around a rotational shaft on the chassis;
a belt member that transmits rotational force of the driving roller;
a tension roller that contacts the belt member to thereby apply tension to the belt member;
a support member that supports the tension roller rotatably and is swingable about the rotational shaft;
a screw by which the support member is fixed to the chassis at a predetermined position; and
a retaining member that is able to be engaged with the chassis,
wherein the support member is fixed between a part of the retaining member and the chassis in an insertion direction of the screw,
wherein the retaining member includes an insertion hole in which the screw is inserted, and a first engagement portion and a second engagement portion that are able to be engaged with the chassis, and the insertion hole is provided between the first engagement portion and the second engagement portion, and
wherein the chassis includes an opening engaged by the first engagement portion.

10. The drive transmission device according to claim 9, further comprising an urging unit configured to urge the support member in a tension applying direction in which the tension roller applies tension to the belt member.

11. The drive transmission device according to claim 10, wherein the support member includes a through hole through which the screw passes and the through hole extends in the tension applying direction.

12. The drive transmission device according to claim 9, wherein the retaining member is engaged with the chassis when the screw is fastened, so that movement in a rotational direction of the screw is regulated.

13. An image reading apparatus comprising:
a conveyance unit configured to convey a document;
a reading unit configured to read the document conveyed by the conveyance unit; and
a drive transmission device according to claim 9.

14. A recording apparatus comprising:
a recording unit configured to record an image on a recording medium;
a conveyance unit configured to convey the recording medium; and
a drive transmission device according to claim 9.

* * * * *